(No Model.)

E. THOMSON.
MANUFACTURE OF INCANDESCENT ELECTRIC LAMPS.

No. 501,172. Patented July 11, 1893.

Witnesses —
Alec F. Macdonald
A. C. Orne

Inventor —
Elihu Thomson
by
Bentley & Blodgett
Attys.

UNITED STATES PATENT OFFICE.

ELIHU THOMSON, OF SWAMPSCOTT, MASSACHUSETTS, ASSIGNOR TO THE THOMSON-HOUSTON ELECTRIC COMPANY, OF CONNECTICUT.

MANUFACTURE OF INCANDESCENT ELECTRIC LAMPS.

SPECIFICATION forming part of Letters Patent No. 501,172, dated July 11, 1893.

Application filed August 5, 1892. Serial No. 442,231. (No model.)

*To all whom it may concern:*

Be it known that I, ELIHU THOMSON, a citizen of the United States, residing at Swampscott, county of Essex, State of Massachusetts, have invented certain new and useful Improvements in the Manufacture of Incandescent Electric Lights, of which the following is a specification.

My invention relates to the manufacture of incandescent electric lights, and its object is to improve the methods heretofore in vogue for expelling residual gas and moisture from the bulbs while they are being exhausted.

It has been customary to bring the filaments to an incandescent state by means of an electric current, and to utilize the heat thus generated for driving out any traces of gas or moisture contained in the bulb, during the process of creating a vacuum therein. My invention aims to provide a satisfactory apparatus and dispense with the electric current, and to expel air or gases by heat applied to the exterior of the bulb.

Figure 1:
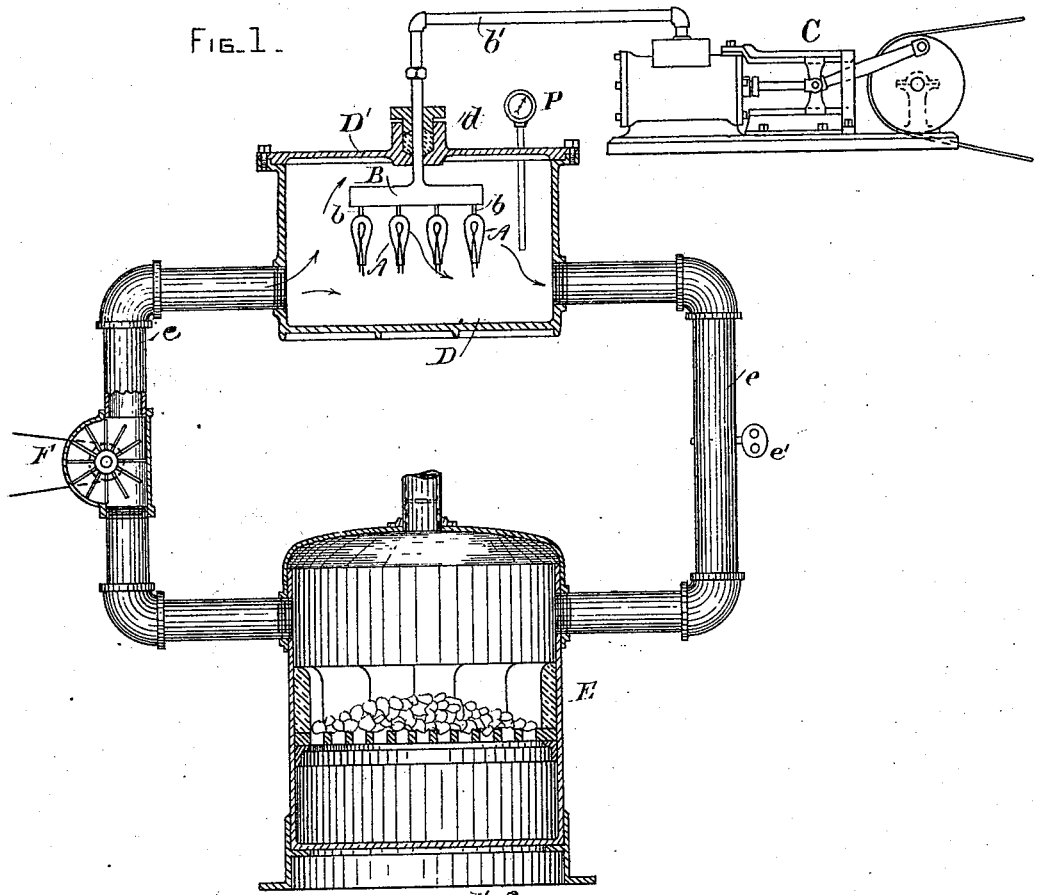
Figure 2:
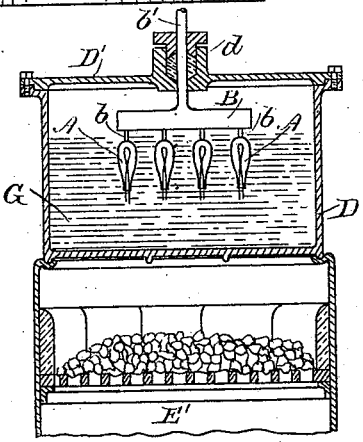

The drawings illustrate two methods of carrying out my invention, Figure 1 showing the bulbs subjected to a hot air current, and Fig. 2 showing them immersed in a hot liquid of proper temperature.

The bulbs A are shown connected by short branches b with a header B which is in turn connected by a pipe b' with an air pump C, by means of which the bulbs are exhausted. The bulbs and the header are inclosed in a box D, which has a lid D' fastened securely thereto. The pipe b' passes to the outside of the box, preferably through a suitable stuffing box d, which may be conveniently arranged in the lid, D'.

Various means may be employed for applying heat to the exterior of the bulbs. In Fig. 1 is shown a furnace E, from which the heat products of combustion are conducted through pipes e to the box D. A circulation of these hot products may be maintained by suitable means, such as a power-driven fan F, whose casing is connected with a pipe e. Instead of using the products of combustion, dry air from a hot air furnace may be employed.

Another arrangement is shown in Fig. 2, where the box D is shown as containing a liquid G, such as water, oil, or the like, which can be heated, preferably by a furnace E' below. The bulbs A are immersed in this hot bath, as shown.

Other modes of carrying out my invention will suggest themselves, but need not be mentioned here.

To regulate the temperature a thermometer or pyrometer P is placed in the box D, Fig. 1, and by means of a damper e' in the pipe leading from the heater the amount of fluid circulating may be caused to increase or diminish. The losses of heat are thus either balanced or exceeded if need be so as to keep or bring box D to an even high temperature, say about melting point of lead or zinc. A pyrometer acting to automatically control the influx of hot fluid may be used, or in other cases it may control the cooling of the box on the ingress of cooling fluid if desired. These methods of regulation may be greatly varied without changing the nature of the invention. The pyrometer might also act to control the circulation, as by changing the intervals of action of the fan F, or further it may control the draft of the furnace or heater.

What I claim as new, and desire to secure by Letters Patent, is—

1. An apparatus for expelling residual air from incandescent lamp bulbs, which consists of a box having a lid adapted to support the lamps and a furnace for heating the contents of the box to the desired high temperature, substantially as set forth.

2. An apparatus for expelling air and gases from incandescent lamp bulbs during exhaustion which consists of a box having a removable cover or lid adapted to support the lamp, a furnace, and circulation pipes connecting said furnace with the box, substantially as described.

3. An apparatus for heating incandescent lamps during exhaustion, consisting of a source of heat such as a furnace, a receptacle with a removable lid adapted to support the lamps and containing a fluid in which they are immersed, a system of pipes for conveying said fluid to and from the source of heat, and means for causing a circulation of said fluid through said pipes, substantially as described.

4. An apparatus for expelling air and gases during formation of a vacuum in incandescent lamp bulbs, which consists of a closed box with a lid adapted to support the lamps, a furnace, pipes connecting said box and furnace, and a fan or equivalent circulating apparatus for causing a circulation through said furnace, pipes and box, substantially as described.

5. In an apparatus for expelling air and moisture from incandescent lamp bulbs during exhaustion, a heater for a fluid stream, a receptacle with a cover adapted to support the lamps, circulation pipes or conduits for the fluid stream connecting the heater and the receptacle, and means for regulating the temperature of the fluid in the receptacle as described.

In witness whereof I have hereunto set my hand this 3d day of August, 1892.

ELIHU THOMSON.

Witnesses:
JOHN W. GIBBONEY,
BENJAMIN B. HULL.